United States Patent [19]
Stieff

[11] 4,106,849
[45] Aug. 15, 1978

[54] FIBER OPTIC SEAL

[76] Inventor: Lorin R. Stieff, P.O. Box 263, Kensington, Md. 20795

[21] Appl. No.: 733,177

[22] Filed: Oct. 18, 1976

[51] Int. Cl.² ............................................. G02B 5/16
[52] U.S. Cl. .................... 350/96.24; 70/440; 350/96.20
[58] Field of Search .............. 350/96 B, 96 BC, 96 R, 350/96 C; 70/440

[56] References Cited
U.S. PATENT DOCUMENTS

| | | | |
|---|---|---|---|
| 3,238,837 | 3/1966 | Woodcock | 350/96 B |
| 3,503,666 | 3/1970 | Moore et al. | 350/96 B |
| 3,825,336 | 7/1974 | Reynolds | 350/96 B |
| 3,854,792 | 12/1974 | Koelle | 350/96 B |

Primary Examiner—John K. Corbin
Assistant Examiner—Stewart Levy
Attorney, Agent, or Firm—James C. Wray

[57] ABSTRACT

A fiber optic bundle is placed through an object to be sealed. Ends of the fibers are spread and threaded through one another in a random dispersion, disorienting the fibers. Randomly reoriented ends are regathered and clamped. A moveable reticle at a light input termini of the fibers creates unique identifiable patterns at the output end of the fibers.

20 Claims, 5 Drawing Figures

FIBER OPTIC SEAL

FIELD OF THE INVENTION

The invention relates to a security seal and more particularly to a tamper-resistant, field-identifiable, fiber optic, security seal which can be continuously monitored for integrity and indentity.

BACKGROUND OF THE INVENTION

Typically, prior art security seals have employed metal tapes or wires whose ends are joined by one-time-use clasps, interlocking metal or plastic cups, or moldable material carrying an inscribed serial number or other type of identifiable mark. Some types of seals have, in addition, randomly inscribed marks or randomly distributed particles which are photographed prior to use and are re-photographed after the seal has been removed and disassembled. Still other seals are identified with the aid of ultrasonic scanners. Although these types of seals are generally effective, they cannot withstand sustained attach, may be counterfeited, are usually not reusable, and cannot be continuously monitored.

Fiber optic seals with juxtaposed and twisted ends are described in U.S. Pat. No. 3,854,792. In devices described in that patent, half of the joined end is illuminated, producing a unique pattern of light on the other half.

SUMMARY OF THE INVENTION

This invention pertains to a tamper-resistant, secure seal whose integrity and unique identity can be checked and/or monitored in the field without disassembly or removal. The seal employs either commercially available or specially prepared glass or plastic optical fiber bundles, and a metal or plastic fiber locking assembly. This assembly holds the fiber bundle securely in place against accidental disassembly and includes mechanism for assuring complete mutual interpenetration of the fibers at each end of the bundle.

To make a seal, an appropriate length of fiber optic bundle material is cut; two tapered collars are placed on the fiber bundle near each end, and approximately 1.25 inches of the protective plastic jacket is removed from each end of the bundle. One of the stripped ends of the fiber bundle is then fully inserted into one of the two cylindrical holes in the bottom edge of the fiber locking assembly and is secured by seating the tapered collar. The free end is then similarly inserted in the remaining cylindrical hole and secured. The internal components of the fiber locking assembly block are designed to flatten the stripped fiber bundle ends into a fan shaped array of fibers so that the fibers from one end of the bundle may easily intersect and pass randomly in between the fanned fibers of the other end. The ends of the fibers above the intersection will now appear in the cylindrical holes at the top or exit edge of the assembly block. The fibers in the two fans are then recombined into two individual bundles by modified tapered collars analogous to those used to secure the jacketed fiber bundle at the base of the fiber locking assembly. These tapered collars hold the loose fibers firmly in place at the top edge of the seal.

The identity of the seal is established in the field by using a small, hand-held microscope and illuminator. The completely assembled seal is placed in the indexing stage of the field microscope. One end of the fiber optic bundle is illuminated by light from a pen-sized flashlight through a 60 degree prism or mirror. All of the fiber ends are illuminated by this reflected light with the exception of those fibers lying directly under a reticle containing at least one opaque line whose width is approximately equal or slightly larger than the diameter of the optic fibers used in the fiber bundle. This reticle may be rotated through an angle of 180 degrees with its center of rotation coinciding with the geometric center of the bundle. In this manner the light entering every fiber in the bundle may be controlled. A provision is made for measuring the angle of rotation of this reticle. The light transmitted through the fibers and emerging at the opposite end of the bundle is magnified and optically examined with the field microscope. The angular position and radial distance from the center of the field of view of the microscope (i.e. the polar coordinates r, $\theta$) of a selected, small set of individual fibers may be measured using the eyepiece reticle and recorded along with the seal's serial number. This position data may be supplemented by additional observations on the size, color, imperfections, and optical transmission properties of the individual fibers. Such data obtained on a small, well dispersed number of fibers (approximately 5) should be sufficient to uniquely identify a seal and should provide reasonable assurance that substitution or counterfeiting of a seal could not go undetected. Alternatively, a photomicrograph may be taken of the random pattern formed by the fiber ends in the field of view of the microscope using a Polaroid or film camera. The photographic procedure is recommended where the highest level of confidence is required and when it must be determined that a seal left unattended and unexamined for significant intervals of time has not been compromised.

The security of this type of fiber optic seal depends upon: (1) the unique fingerprint which is generated by the totally random pattern at the ends of the fiber optic bundle, (2) the unique scrambled or decoded image of the line reticle introduced at the illuminated end of the fiber bundle, (3) the ability to verify the optical continuity of every fiber in the bundle, (4) the necessity to completely destroy the fingerprint during disassembly, (5) the formidable problem which would be encountered in any effort to duplicate this unique fingerprint, and (6) the equally formidable problem of reestablishing the light transmitting capability of the individual fibers interrupted in the process of cutting the fiber bundle.

If there is a requirement to continuously monitor a fiber optic seal, the fiber locking assembly block may be inserted into a solid state monitoring device. The monitor contains a pulsed LED light source which is used to illuminate one end of the fiber bundle, a photo-transistor circuit which detects the light transmitted through the fiber optic loop, and a microprocessor with the necessary associated components to generate and display, or transmit on demand a time ordered random number. Interruption of the light transmitted through the fiber optic bundle, harassment of the electronic monitor, or electronic failure will clear the random number generator with only the last undisturbed number remaining in the memory of the unit. These electronic components are housed in a small, secure, tamper-indicating container, such as a stressed glass cut. The order of the random number generated within the monitor is known only to the organization which has installed the seal. The random number sequence generated by each seal is, of course, also unique to that seal alone. The random number generated by the monitor may be displayed on demand to either the inspector, the facility operator where the seal is installed, or the number may be transmitted to the organizational headquarters.

One object of the invention is to provide a tamper-resistant, fiber optic security seal.

Another object of the invention is the provide a security seal whose unique identity and optical integrity can be verified in the field without disassembly or the removal of the seal.

Another object of the invention is to provide a tamper-resistant seal which can be applied in a wide variety of hostile environments and which is capable of withstanding sustained attempts to defeat the seal.

Another object of the invention is to provide a seal which can be identified in the field by using either visually obtained microscopic data on the position and appearance of individual fibers or by using photomicrographic methods to record the fingerprint and decoded image of the line reticle formed by the random distribution of the optical fibers at the end of the bundle.

Still another objective of the invention is to provide a tamper-resistant seal which can be continuously monitored for its optical integrity and identity over sustained periods during which the seal will be unattended.

One advantage of the present invention is that the fiber optic seal is tamper resistant.

Another advantage of the invention is that the identity and optical integrity of the seal can be established in the field without removal or disassembly of the seal.

Another advantage of the invention is that the seal can be continuously monitored in the field for its optical integrity and identity, and if desired, an encoded status report on the seal transmitted to headquarters.

Another advantage of this seal is that it is easily and quickly installed during field operations.

Yet another advantage of the seal is that it is reusable and that it can be easily applied in a wide variety of situations.

One object of the invention is the provision of a fiber optic seal having a block with crossed pathways having openings in spaced relationship on facial areas of the block and an optic fiber bundle in a pathway within the block.

Another object of the invention is the provision of a fiber optic seal with a holder for mounting a portion of an optic fiber bundle in an opening at the end of a pathway in a block.

The invention has as a further object the provision of a fiber optic seal with a chuck having an inner bore receiving a fiber optic bundle, having an outer portion which engages a passageway and having a tapered outer portion with a slit extending from the tapered outer portion to the bore, whereby the tapered outer portion is compressed upon a bundle, and a collet having an outer portion fitting within the passageway wall having a tapered inner opening for cooperating with the tapered outer portion of the chuck to clamp a fiber optic bundle.

Another object of the invention is the provision of a fiber optic seal having a spreader mounted near an intersection of passageways in a block for spreading fibers in a fiber optic bundle.

A further object of the invention is the provision of optic fiber spreaders having outer portions for fitting in walls of passageways, having distal ends facing outward in the passageways and having proximal ends for positioning near an intersection of the passageways, the spreaders having bores extending inward from distal ends and having channels extending inward from the bores, the channels being generally rectangular in cross section and having a transverse dimension less than a similar transverse diametrical dimension of the bore, whereby fibers are restricted in that direction and are spread and fanned outward in the channels.

A further object of the invention is the provision of optic fiber spreaders as described wherein proximal ends of the inserts are configured for interengaging and abutting proximal ends of other inserts.

Another object of the invention is the provision of a fiber optic seal with a fiber optic bundle having a first end positioned in one pathway in a block, having a medial portion extending from the block and having a second end remote from the block.

Another object of the invention is the provision of a fiber optic seal wherein a portion of a first end of a fiber optic bundle positioned within an intersection of the pathways in a block has fibers arranged to randomly receive crossed fibers in interstices between fibers.

Another object of the invention is the provision of a fiber optic seal wherein a terminus of a bundle is tightly held in a facial opening at the end of a first passageway in a block, and wherein a portion of a fiber optic bundle which emerges from an opening at the opposite end of the first passageway is tightly held in that opening.

This invention has as a further object the provision of a fiber optic seal as described wherein a free end of the fiber optic bundle has an outer covering removed from a length of the bundle from a remote terminus of the bundle at least as far along the bundle as a distance from an intersection to an opening of a second passageway in the block.

Another object of the invention is the provision of a fiber optic seal having means for selectively controlling the light source for selected illumination of optic fiber termini at one end of a bundle.

A further object of the invention is the provision of a fiber optic seal with a reticle between a light source and fiber termini and means for moving the reticle.

The invention has as a further object the provision of a fiber optic seal with a reticle having an opaque line diametrically positioned across an optical axis connecting a light source and a medial portion of fiber termini, the line being slightly wider than a fiber diameter, and a rotatable wheel on which the reticle is positioned.

A further object of the invention is the provision of a fiber optic seal having a fiber optic bundle with a plurality of coextensive and coterminal optical fibers held together with portions of the fiber near one end of the bundle threaded between portions of the fibers near the opposite end of the bundle in random arrangement, means to separately hold first and second remote termini of the bundle of fibers, means for introducing light into the first termini, and means for observing light in the second termini, and means for predeterminately interrupting light in the first termini and means for recording locus of fiber ends in the second termini showing characteristics of interrupted light.

Another object of the invention is the provision of a fiber optic seal with a fiber optic bundle with a medial portion for engaging an object to be sealed and end portions having randomly interspersed fibers, means for holding termini of the fibers and means for eliminating some of the termini and means for receiving illumination of other of the termini, reticle means for interposing between the illuminating means and said some of the termini for selectively partially preventing illumination, and means for moving the reticle means for changing the masking.

These and other and further objects and features of the invention are apparent in the disclosure which includes the above and ongoing specification, including the claims and the drawings.

DETAILED DESCRIPTION OF THE DRAWINGS

Figure 1:
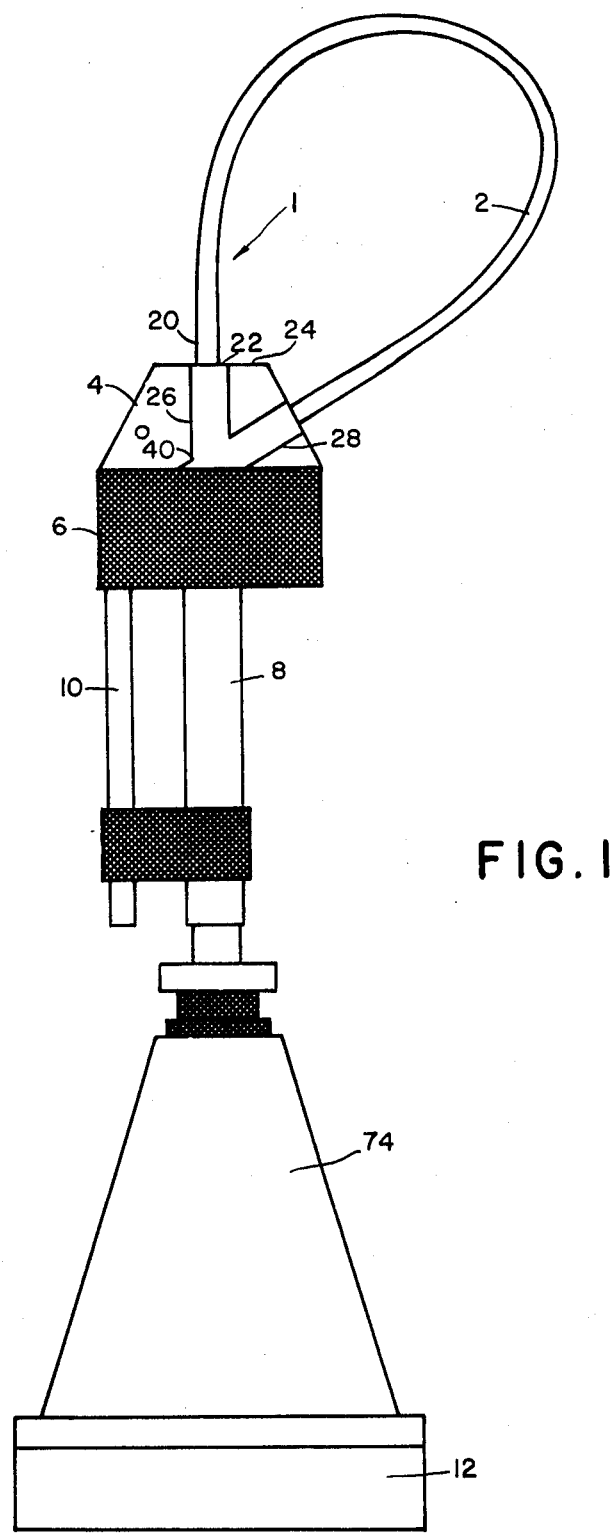
FIG. 1 shows a schematic view of the field identifiable field optic seal in accordance with the invention.
Figure 2:
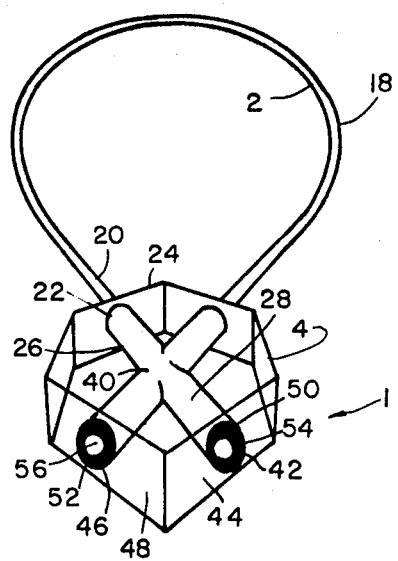
FIG. 2 is a view of an assembled seal including the fiber locking assembly block and a fiber optic bundle.
Figures 3, 4:
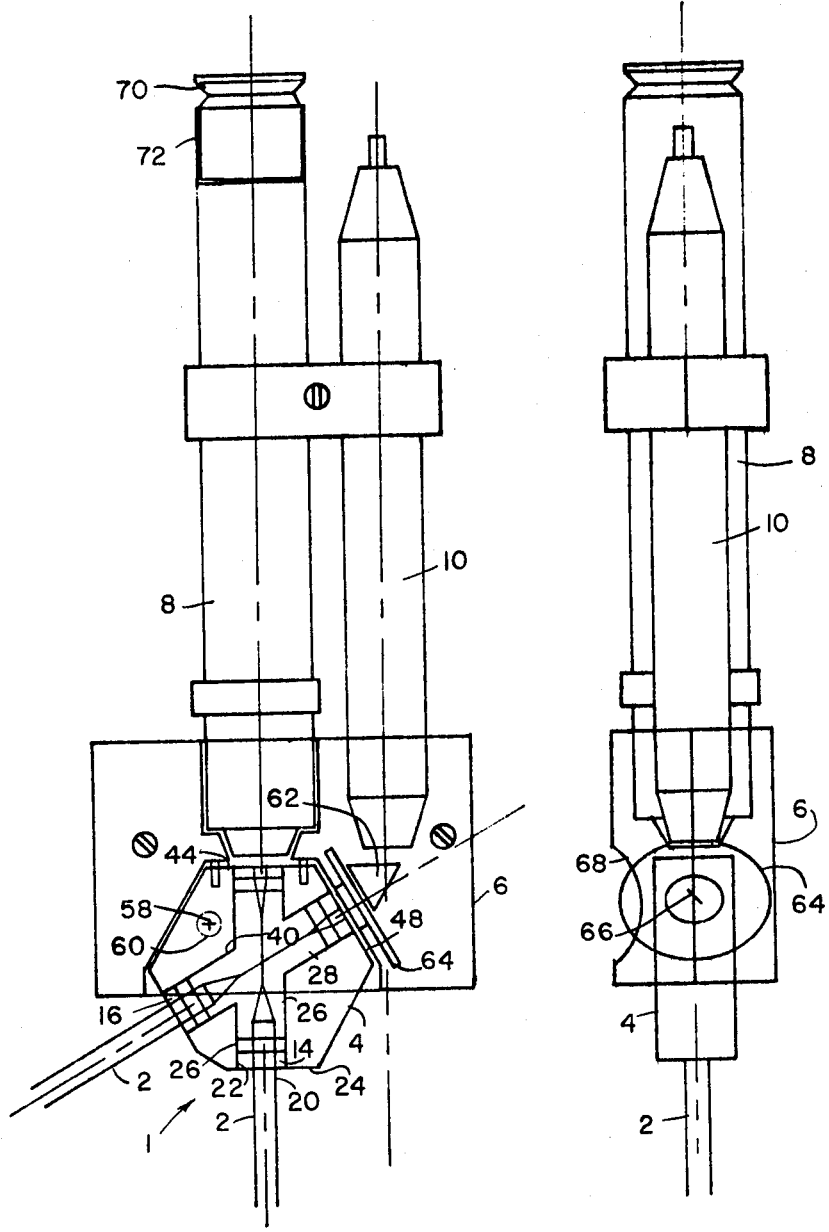
FIGS. 3 and 4 show the hand-held microscope, illuminator, seal, and fiber locking assembly block in more detail.

FIGS. 1 through 4 show a field assembled, fiber optic seal 1, fiber optic bundle 2 and fiber-locking block assembly 4 inserted in the indexing stage 6 of a hand-held field microscope 8 and illuminator 10 and the camera 12 used to take the identification photo micrograph.

Figure 5:
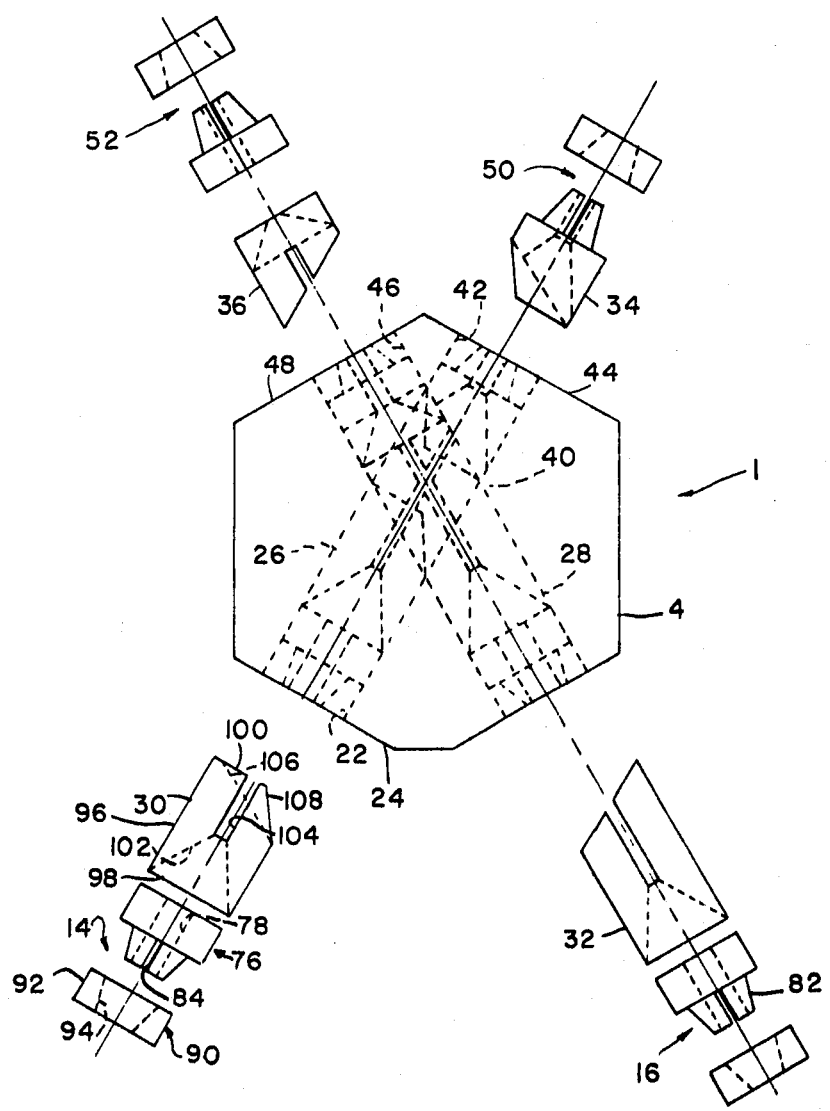
FIG. 5 is an exploded view, showing the internal construction of the fiber locking assembly block.

To assemble the seal 1 the following operations are performed: An appropriate length of fiber optic bundle material is cut to the length required to apply the seal. Two tapered collars 14 and 16, as shown in FIG. 5, are inserted over the ends of the fiber optic bundle. Approximately 1¼ inch of the plastic jacketing 18 surrounding the fiber optic bundle is removed from each end of the bundle. One end 20 of the fiber optic bundle 2 is fully inserted into one of the openings 22 in the bottom face 24 of the fiber locking assembly block 4. Tapered collar 14 is securely seated into one passageway 26. The free end of the fiber optic bundle is threaded through the object to be sealed and is then inserted into the remaining cylinderical passageway 28 in assembly block 4. The tapered collar 16 is seated and secured. On completion of these steps the fiber optic bundle 2 is now firmly held in place by the tapered collars 14 and 16. The interior components 30, 32, 34 and 36 of the fiber locking assembly block (shown in FIG. 5) flatten the optical fibers permitting them to easily intersect at intersection 40 and pass through each other and through openings 42 and 46 at the opposite faces 44 and 48 of the fiber locking block 4.

The seal is completed by inserting and firmly seating the tapered collars 50 and 52 in the top openings 42 and 46 of the top faces 44 and 48 of the assembly block 4. This operation brings the fanned fibers termini 54 and 56 into two circular bundles and holds them securely in place.

The identity and optical integrity of the seal is established in the field by inserting the fiber locking block 4 of the completed seal into the indexing stage 6 of the hand-held microscope illuminator 8 and 10. The symmetry of the fiber locking assembly block permits either bundle end to be observed under the microscope 8. The orientation of the fiber locking assembly may be determined by the presence of the symbol such as "+" 58 in a viewing port 60 on the side of the indexing stage 6. The opposite end of the fiber optic bundle is illuminated through a 60 degree prism 62 by a small pen-sized flashlight 10. A reticle 64 lies in a plane between the light source 10 immediately above the ends of the fiber bundle being illuminated. The reticle 64 contains at least one inscribed, opaque line 66 whose width is equal or slightly greater than diameters of the fibers used in the fiber bundle 2. This reticle may be rotated through 180° and the reticle holder 68 is appropriately indexed so that it is possible to measure the angle of rotation of the reticle 64. Rotation of the reticle 64 permits the controlled illumination of every fiber in the bundle. In addition, the image of this line reticle transmitted by the fiber optic bundle will be scrambled or decoded at the opposite end of the bundle because of the random orientation of the fibers in the two ends of the fiber optic bundle. Under the microscope the line image will appear as a series of randomly distributed, darkened fibers, which will resume light transmission as the reticle is rotated.

The magnification and the field of view of the hand-held microscope is adjusted so that all of the fibers at the light transmitting end of the bundle can be observed. The eye piece 70 of the microscope 8 is equipped with an additional, rotatable reticle 72, with which the observer may measure both the distance of a single fiber from the center of the field of view of the microscope as well as the angle through which the reticle must be rotated from a fixed, indexed point in order to intersect the image of the fiber end. To identify a seal, the observer notes the polar coordinates of a small selected number of fibers whose illumination can be controlled by the rotatable line reticle 64. The position of the line reticle may be fixed at 0° or it may be set at some other predetermined angle by the observer. A serial number on the block and the reticle degree are recorded in a notebook. The observer then measures for the specifically darkened fiber, the radial distance from the center of the field of view and angle of the fiber from the 0° point, using the reticle in the eye piece of the microscope. This information is also recorded in the same field notebook. In addition to the polar coordinates of this particular group of fibers, the observer may in addition record information on the size, color, imperfections in the fiber ends and the light transmitting properties of the fibers. On a subsequent visit the identity and optical integrity of the seal is re-established by inserting the seal into the stage of the hand-held microscope and reconfirming the polar coordinates data and characteristics previously recorded at the time that the seal was assembled.

For certain seal applications, it may be desirable to supplement the type of information obtained using the illumination and eyepiece reticles by making a photo micrograph of all of the fibers in the end of the bundle being observed. This photo micrograph may be made by attaching camera 12 fitted with an adapter 74 to the microscope occular. It is recommended that if a Polaroid camera is to be used for the initial photo micrograph taken immediately after the assembling of the seal, Type 105P/N film be used in order that a negative of the fiber bundle image may be obtained. This negative is then marked with the serial number of the seal, the angular position of the line reticle and is filed for future reference. On subsequent occasions when the identity and integrity of the seal must be checked, a Polaroid positive print is made and the original negative is placed over the positive print. Even extremely small variations in fiber position, shape imperfections and light transmitting properties can be detected in this manner. The probability that this degree of replication can be counterfeited is highly unlikely and therefore this seal represents a maximum level of protection.

The present fiber optic seal design can, if the situation requires, be supplemented by an electronic monitor which continuously checks the optical integrity and the identity of the seal during periods when the seal must be left unattended. The condition of the seal may be reported on a fixed schedule by the host facility where the seal has been applied and checked by an inspector during a routine inspection. It is possible that the output of the monitor can be transmitted directly to the headquarters of the inspecting agency if very prompt notification of a seal failure or of an attempt to remove the seal is required.

As shown in FIG. 5, clamps 14, 16, 50 and 52 have two parts 76 and 90. Bore 78 receives fiber optic bundle 2 and outer wall 80 engages an inner wall of the passageway. Tapered portion 82 has a slit 84 which extends through 6 bore 78. Collet 90 has an outer wall which tightly (interference fit) engages the inner cylindrical wall of passageway 26. Slope 94 is a few degrees different than the slope of taper 82. Consequently, when collet 90 is forced inward, taper 82 compresses to decrease bore 78, gripping bundle 2. Fiber spreading inserts 96 have faces 98, which abut chucks 76, and internal faces 100 which are configured to abut and interengage similar internal faces. Tapers 102 direct fibers in bundles 2 into spreading channels 104, which extend across the inserts in one direction, and which are laterally restricted in a transverse direction. The combined inserts fan fibers at their intersection, facilitating random interspersions of fiber ends in interstices between previously inserted fibers.

Internal tapers 106 and external slopes 108 assure correct interfitting of the inserts.

While the invention has been described with reference to specific embodiments, modifications and variations may be constructed and used without departing from the scope of the invention, which is defined in the following claims.

I claim:

1. Fiber optic seal apparatus comprising a block, first and second pathways crossed within the block, the pathways having openings in spaced relationship on facial areas of the block, bundle holding means connected to the block for holding an optic fiber bundle end inserted in each pathway with portions of the fibers near one end of the bundle threaded between portions of the fibers near the opposite end of the bundle in random arrangement within the block with a medial portion of the bundle passing through an object to be sealed.

2. The fiber optic seal apparatus of claim 1 wherein the holding means further comprises a collet having an inner bore for receiving a fiber optic bundle, the collet having an outer portion which engages the wall of the passageway and having a tapered outer portion with a slit extending from the tapered outer portion to the bore, whereby the tapered outer portion may be compressed, compressing the bore upon a bundle, and a collar having an outer portion fitting within the passageway wall having a tapered inner opening for cooperating with the tapered outer portion of the collet to compress the tapered portion of the collet on a fiber optic bundle.

3. The fiber optic seal apparatus of claim 1 further comprising spreading means mounted in the passageways near an intersection of the passageways for receiving the fiber optic bundles and for orienting fibers in the bundles in laterally spread position.

4. The fiber optic seal of claim 3 wherein the spreading means comprise inserts having outer portions for fitting in walls of the passageways, having distal ends facing outward in the passageway and having proximal ends for positioning near the intersection of the passageways, the inserts having bores extending inward from distal ends and having channels extending inward from the bores, the channels being generally rectangular in cross section and having a transverse dimension less than a similar transverse diametrical dimension of the bore, whereby fibers are restricted in that direction and are spread and fanned outward in the channel.

5. The fiber optic seal apparatus of claim 3 wherein proximal ends of the inserts are configured for interengaging and abutting proximal ends of other inserts.

6. The fiber optic seal apparatus of claim 1 further comprising a fiber optic bundle having a first end positioned in one of the pathways, having a medial portion extending from the block and having a second end remote from the block.

7. The fiber optic seal apparatus of claim 6 wherein a portion of the first end of the fiber optic bundle which is positioned within an intersection of the pathways in the block comprises fibers arranged to randomly receive crossed fibers in interstices between fibers.

8. The fiber optic seal apparatus of claim 7 wherein a terminus of the first end is tightly held in a facial opening at the end of the first passageway and wherein a portion of the fiber optic bundle which emerges from an opening at the opposite end of the first passageway is tightly held in that opening.

9. The fiber optic seal apparatus of claim 8 wherein the free end of the fiber optic bundle has an outer covering removed from a length of the bundle from a remote terminus of the bundle at least as far along the bundle as a distance from an intersection to an opening of the second passageway in the block.

10. The fiber optic seal apparatus of claim 6 further comprising means for holding a portion of the fiber optic bundle near a free end in a first opening of the second passageway of the block and means for holding the terminus of the second end of the fiber optic bundle in a second opening of the second passageway in the block.

11. The fiber optic seal apparatus of claim 10 wherein the holding means comprise clamping means for clamping the fiber optic bundle at the first and second openings of the second passageway.

12. The fiber optic seal apparatus of claim 1 wherein the block is generally angular in configuration with first and second major parallel faces connected by angularly related side faces, with opposite side faces being generally parallel and wherein the passageways extend through the block with openings in opposite side faces.

13. The apparatus of claim 1 further comprising means for mounting the block in a holder with one opening of each passageway extending toward the holder, and wherein the holder has means for communicating a light source with one opening.

14. The fiber optic seal apparatus of claim 13 wherein the means for communicating a light source includes means for selectively controlling the light source for selective illumination of optic fiber termini in the one opening.

15. The fiber optic seal apparatus of claim 14 wherein the selective means comprises means for interposing a reticle between the light source and the fiber termini and means for moving the reticle.

16. The fiber optic seal apparatus of claim 15 wherein the reticle comprises an opaque line diametrically positioned across an optical axis connecting a light source and a medial portion of fiber termini and wherein the means for moving the reticle comprises a transparent wheel means on which the reticle is positioned.

17. Fiber optic seal apparatus comprising a fiber optic bundle having a plurality of coextensive and coterminal optical fibers held together with a medial portion for engaging an object to be sealed, with portions of the fibers near one end of the bundle threaded between portions of the fibers near the opposite end of the bundle in random arrangement, means to separately hold first and second remote termini of the bundle of fibers, means for introducing light into the first termini, and means for observing light in the second termini, and means for predeterminately interrupting light in the first termini and means for recording locus of fiber ends in the second termini showing characteristics of interrupted light.

18. The fiber optic seal apparatus of claim 17 wherein the means for interrupting light comprises moveable reticle means positioned between a light source and the first termini.

19. The fiber optic seal apparatus of claim 18 wherein the moveable reticle means comprises an opaque area on a transplant portion of a wheel mounted for rotation in a light path between the light source and the first termini.

20. Fiber optic seal apparatus comprising a fiber optic bundle having a plurality of fibers with a medial portion fof engaging an object to be sealed and with end portions having randomly interspersed fibers, with portions of fibers in one end of the bundle interspersed among portions of fibers near an opposite end of the bundle, means for holding termini of the fibers and means for illuminating some of the termini and means for receiving illumination of other of the termini, reticle means for interposing masking between the illuminating means and said some of the termini for selectively partially preventing illumination, and means for moving the reticle means for changing the masking.

* * * * *